United States Patent
Tatar et al.

(10) Patent No.: US 9,407,112 B2
(45) Date of Patent: Aug. 2, 2016

(54) WIRELESS SENSOR WITH ENERGY SCAVENGER

(75) Inventors: Florin Tatar, Delft (NL); Frank De Wit, Noordeloos (NL)

(73) Assignee: AKTIEBOLAGET SKF, Gothenburg (SE)

( * ) Notice: Subject to any disclaimer, the term of this patent is extended or adjusted under 35 U.S.C. 154(b) by 1065 days.

(21) Appl. No.: 13/501,488

(22) PCT Filed: Nov. 18, 2009

(86) PCT No.: PCT/EP2009/008220
§ 371 (c)(1),
(2), (4) Date: Jun. 26, 2012

(87) PCT Pub. No.: WO2011/060798
PCT Pub. Date: May 26, 2011

(65) Prior Publication Data
US 2012/0261991 A1    Oct. 18, 2012

(51) Int. Cl.
*H02J 7/34*    (2006.01)
*H02J 7/32*    (2006.01)
*H02J 9/00*    (2006.01)

(52) U.S. Cl.
CPC . *H02J 7/32* (2013.01); *H02J 9/005* (2013.01); *H02J 7/345* (2013.01); *Y10T 307/527* (2015.04)

(58) Field of Classification Search
USPC ...................................................... 307/48, 66
See application file for complete search history.

(56) References Cited

U.S. PATENT DOCUMENTS

| 5,341,034 A * | 8/1994 | Matthews ............... H02J 9/061 307/66 |
|---|---|---|
| 2004/0100100 A1 | 5/2004 | Wilson |
| 2004/0164558 A1 | 8/2004 | Adamson |
| 2005/0110277 A1 | 5/2005 | Adamson et al. |
| 2005/0140212 A1 | 6/2005 | Hamel et al. |
| 2006/0243043 A1 | 11/2006 | Breed |
| 2007/0074566 A1 | 4/2007 | Roundy et al. |
| 2008/0047363 A1 | 2/2008 | Arms et al. |

FOREIGN PATENT DOCUMENTS

WO    WO2008059226 A2    5/2008

OTHER PUBLICATIONS

Tracy Wotherspoon and Giles Stanley, "The Power of a Heartbeat," Sep. 4, 2009, 1-5.

* cited by examiner

*Primary Examiner* — Rexford Barnie
*Assistant Examiner* — Dru Parries
(74) *Attorney, Agent, or Firm* — Bryan Peckjian; SKF USA Inc. Patent Dept.

(57) ABSTRACT

An apparatus (100) comprises a wireless sensor system (102) with electronic circuitry (104) and a power supply (106) for powering the electronic circuitry. The power supply comprises a primary cell (108) and an energy scavenger (110). The energy scavenger scavenges ambient energy and converts the scavenged ambient energy into electric energy. The sensor system is configured for having the primary cell power the electronic circuitry when the energy scavenger is inactive. The system is configured for performing at least one of having the energy scavenger power the electronic circuitry via the primary cell when the energy scavenger is active, using a capacitance of the primary cell as a buffer for the electric energy; and having the energy scavenger recharge the primary cell.

19 Claims, 2 Drawing Sheets

WIRELESS SENSOR WITH ENERGY SCAVENGER

CROSS-REFERENCE

This application is the US national stage of International Application No. PCT/EP2009/008220 filed on Nov. 18, 2009.

FIELD OF THE INVENTION

The invention relates to an apparatus comprising a system that includes electronic circuitry and a power supply for powering the electronic circuitry. The power supply has an energy scavenger operative to scavenge ambient energy and convert the scavenged ambient energy into electric energy. The invention also relates to a system for use in such an apparatus, to a power supply for use in such a system, and to a method of powering electronic circuitry.

BACKGROUND ART

The expressions "energy scavenging" and "energy harvesting" refer to technologies, known in the art, for converting ambient, stray energy, available from external sources, into electricity. For example, a piezoelectric crystal can be used to convert mechanical energy from vibrations into electric energy. As another example, a temperature difference between two different electrical conductors can be used to generate a voltage across, or current through, the junction of the conductors. As still another example, consider a magnet that is made to move past a coil as a result of the vibratory or cyclic motion of a mass to which the magnet is attached. The moving magnet generates a change of magnetic flux in the coil, and induces an electromotive force on the coil. Accordingly, a plurality of technologies is available for extracting energy from the environment. A component, which extracts stray energy from its environment and makes the extracted energy available for consumption, is referred to as an energy scavenger.

For completeness, the expression "energy scavenger" as used throughout this text and the claims, is also meant to cover the concept of an energy harvester, for anyone who would like to make this distinction. An energy scavenger takes energy from the side effects of a process in a dynamic system. Consider, for example, deriving energy from the heat that is produced by the unavoidable friction in a running rolling-elements bearing or a plain bearing). In practice, taking energy from the side effects hardly affects the process itself, if at all. An energy harvester takes energy from the process itself and thereby influences the system. In principle, the energy drained from the process needs to be replaced by the power source driving the process. Consider, for example, the dynamo installed on a bicycle to power the bicycle's headlight and rear lamp. The dynamo is driven by the bicycle's rotating front wheel or rear wheel that in turn is driven by the rider him/herself via the pedals.

The extracted energy is stored in, e.g., a rechargeable battery or a supercapacitor. A rechargeable battery is also referred to as a secondary cell. A supercapacitor is also known as an electric double-layer capacitor. A supercapacitor is an electrochemical capacitor that has a much higher energy density than a conventional capacitor, owing to the use of a layer of nano-porous material that dramatically increases the layer's surface area, allowing many more charge carriers to be stored in any given volume.

A typical application of using an energy scavenger is the powering of small autonomous electronic devices, e.g., sensors, or actuators. These devices are small and require little power. Their applications are limited by the availability of electric power. Scavenging energy from ambient vibrations, wind, heat, light, etc., enables to replenish the energy drawn from the energy storage for consumption by the electronic device, so as to keep the device functioning over a time span that is long in view of the amount of energy available from the energy storage in the absence of the energy scavenger. Such devices can be exploited in, e.g., condition monitoring applications.

For examples of energy harvesting for wireless sensors see, e.g., U.S. patent application publication No. 20050140212, or U.S. patent application publication No. 20080047363. The harvested energy is stored in a rechargeable battery.

SUMMARY OF THE INVENTION

The invention relates to an apparatus with a system that includes electronic circuitry and a power supply for powering the electronic circuitry. The power supply comprises a primary cell, also referred to as a disposable battery, and an energy scavenger. The energy scavenger is operative to scavenge ambient energy and convert the scavenged ambient energy into electric energy. The system is configured for having the primary cell power the electronic circuitry when the energy scavenger is inactive. The system is configured for performing at least one of following operations: having the energy scavenger power the electronic circuitry via the primary cell when the energy scavenger is active, using a capacitance of the primary cell as a buffer for the electric energy; and having the energy scavenger recharge the primary cell.

Accordingly, the electronic circuitry in the apparatus of the invention is selectively powered by the energy stored in the primary cell or by the energy directly supplied by the energy scavenger. Consuming the energy supplied by the energy scavenger saves the energy stored in the primary cell, thus prolonging the service life of the primary cell. In the later case, the primary cell serves as an energy buffer that converts the high output-impedance of the energy scavenger into a low-impedance voltage source.

As to the recharging of the primary cell, consider the following. Secondary cells (i.e., rechargeable batteries) and supercapacitors are relatively expensive components compared to primary cells (i.e., disposable batteries). Examples of a primary cell are an alkaline battery, and a liquid cathode lithium battery such as a lithium thionyl chloride battery or a lithium sulphur dioxide battery. The energy, drawn from such primary cell, can be replenished at least to some extent. Chemical reactions drive the operation of the primary cell to supply power to an external load. It is believed that the chemical reactions in most types of primary cells can be reversed. The reversal forms the basis of the recharging capability. However, physical and/or chemical properties of the primary cell may render the reversal of the chemical reactions impractical. For example, the cathode of a disposable battery is typically a big lump of material that is consumed (i.e., transferred to the anode) during discharge. It is difficult to re-form the lump of material into its original shape. For this reason, rechargeable batteries have the active ions stored in an atomic or molecular lattice that stays behind, thus maintaining the scaffolding for the original shape. However, the energy withdrawn from a disposable battery can be replenished. As a result, the energy supplied by the energy scavenger can be used to also recharge the primary battery, further prolonging service life of the primary battery.

In an embodiment of the apparatus in the invention, the electronic circuitry is configured for selectively operating in a low-power mode or in a high power mode. The system is configured for having the electronic circuitry operate in the low-power mode when the energy scavenger is inactive; and for having the electronic circuitry operate in the high-power mode when the energy scavenger is active. Alternatively, the system is configured for having the electronic circuitry operate in the high-power mode less frequently when the energy scavenger is inactive, and more frequently when the energy scavenger is active.

When the electronic circuitry is operating in a low-power mode, the electronic circuitry is slowly draining the primary cell over a period of time. The electronic circuitry comprises, e.g., a microprocessor that performs low-performance functions in the low-power mode. When the energy scavenger becomes active, additional electric energy becomes available from the energy scavenger. The electronic circuitry can then use the energy from the energy scavenger in a high-power mode, or the energy from the energy scavenger can be used to at least partly replenish the amount of energy that has been drawn from the primary cell by the electronic circuitry. The additional energy available from the energy scavenger enables the electronic circuitry to carry out a high-performance task. In the absence of the additional energy, carrying out of the high-performance task would quickly drain the primary cell, or would not even be possible if the primary cell were discharged before the high-performance task was completed. The electronic circuitry may decide, on the basis of one or more further criterions, to carry out a low-performance task instead of a high-performance task, even if the additional energy is available from the energy scavenger.

In a further embodiment of the apparatus, the system is operative as a wireless sensor configured for condition monitoring of the apparatus or an element of the apparatus, e.g., a rolling-elements bearing. The system is then operating autonomously, i.e., having its own power supply, is of a lower cost than comparable systems using a rechargeable battery or a supercapacitor, and can be mounted as an after-market add-on.

The invention also relates to a system for use in the apparatus specified above, and to a power supply for use in such a system.

In an embodiment, the energy scavenger becoming active is detected, e.g., by a watchdog circuit forming part of the electronic circuitry itself, or a watchdog circuit accommodated at the power supply external to the electronic circuitry. The electronic circuitry can then be notified of the fact that additional energy is currently available. Thereupon, the electronic circuitry may decide to consume this additional energy right away in order to be able to operate in a high-power mode and executing a high-performance task. Alternatively, the electronic circuitry may decide to continue operating in the low-power mode. The electric energy is then transferred to the primary cell for at least partly replenishing the amount of energy that has been drawn from the primary cell by the electronic circuitry operating in the low-power mode. Preferably, the energy at the primary cell is replenished in a controlled manner, e.g., under control of a microcontroller operating according to a pre-determined procedure, so as to take into account the constraints imposed by the chemical and physical properties of the primary cell.

The invention also relates to a method of powering electronic circuitry. The method comprises scavenging ambient energy and converting the scavenged ambient energy into electric energy. The method further comprises at least one of: supplying the electric energy to the electronic circuitry via a primary cell when scavenging, while using a capacitance of the primary cell as a buffer for the electric energy; and recharging the primary cell.

Note that in the invention, the electronic circuitry can continue operating so long as enough power is available from the primary cell. For example, the electronic circuitry comprises a microprocessor that remains active continually. In the low-power mode, the operating system is running and data is being kept in a volatile memory, thus being able to continually provide at least low-power functionality.

BRIEF DESCRIPTION OF THE DRAWING

The invention is explained in further detail, by way of example and with reference to the accompanying drawing, wherein.

DETAILED EMBODIMENTS

Figure 1:
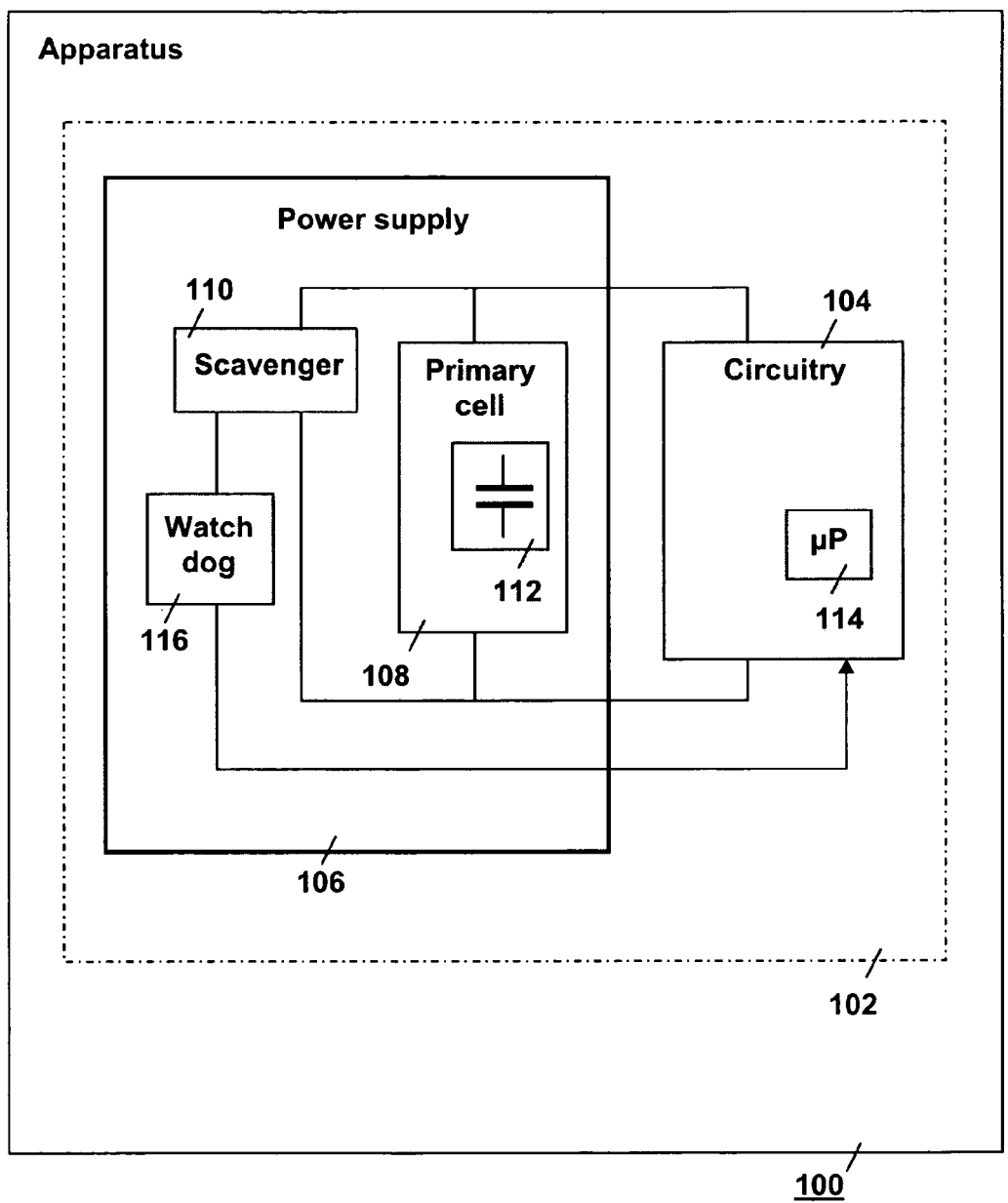
FIGS. 1 and 2 are block diagrams of embodiments of an apparatus in the invention. Throughout the drawings, similar or corresponding features are indicated by same reference numerals.

FIG. 1 is a block diagram of a first embodiment of an apparatus 100 in the invention. The apparatus 100 comprises an autonomous system 102. The autonomous system 102 includes electronic circuitry 104 and a power supply 106 for powering the electronic circuitry 104. The electronic circuitry 104 of the autonomous system 102 includes, e.g., a wireless sensor (not shown) for sensing a magnitude of a physical quantity for the purpose of condition monitoring during operational use of the apparatus 100. Data representative of the sensed physical quantity is buffered locally in a memory (not shown) at the electronic circuitry 104, and transmitted using a wireless transmitter (not shown). Alternatively, the electronic circuitry 104 in the autonomous system 102 comprises an actuator (not shown) for controlling operation of a mechanical component (not shown), such as a valve in a pipeline (not shown), or a sun visor (not shown) of the apparatus 100, in dependence on a magnitude of the physical quantity sensed.

The power supply 106 comprises a primary cell 108, and an energy scavenger 110. The energy scavenger 110 is operative to scavenge ambient energy and convert the scavenged ambient energy into electric energy. The power supply 106 is configured for having the primary cell 108 supply power to the electronic circuitry 104 when the energy scavenger 110 is inactive. The power supply 106 is configured for having the energy scavenger 110 supply the power to the electronic circuitry 104 via the primary cell 108 when the energy scavenger 110 is active, using a capacitance 112 of the primary cell 108 as a buffer for the electric energy. The primacy cell 108 comprises one or more disposable batteries of a type specified above.

The electronic circuitry 104 comprises a microprocessor 114 for control of the operation of the electronic circuitry 104. The electronic circuitry 104, including the microprocessor 114, is configured for selectively operating in a low-power mode or in a high-power mode. In the low-power mode, the electronic circuitry 104 carries out one or more low-performance functions and draws relatively small amounts of energy from the primary cell 108. In the high-power mode, the electronic circuitry 104 carries out one or more high-performance functions, which require relatively large amounts of energy that are supplied by the energy scavenger 110. Accordingly, while the energy scavenger 110 is inactive, there may, in general, not be enough energy available from the primary cell 108 for operating in the high-power mode. When the energy scavenger 110 has become active, sufficient energy may be available to the electronic circuitry 104 for operating in the high-power mode. The designer of the autonomous system 102 therefore has to properly dimension at least one of: the power requirements of the intended tasks to be performed, the power consumption of the electronic circuitry 104, the power supply from the energy scavenger 110 and the power delivery capacity of the primary cell 108, so as to be able to cater to the expected patterns of the energy consumption by the autonomous system 102.

As specified above, the electronic circuitry 104 is configured for selectively operating in different modes requiring different levels of power, e.g., a high-power mode and a low-power mode. The high-power mode is preferably assumed only if the energy scavenger 110 is active. In an embodiment of the autonomous system 102, the power supply 106 comprises a watchdog circuit 116. The watchdog circuit 116 is operative to generate a control signal to notify the electronic circuitry 104 when the energy scavenger 110 has become active or has become inactive. The electronic circuitry 104 may then decide whether or not to switch from a lower-power mode to a high-power mode. The switching to a high-power mode is then not only controlled by the energy scavenger 110 having become active, but is also dependent on one or more other criterions. The watchdog 116 is preferably a simple circuit that discriminates between voltages below a certain threshold and voltages above the threshold.

An analog-to-digital converter (ADC), not shown here, is an example of a low-current device that enables the microprocessor 114 to distinguish between a high voltage (available from the energy scavenger 110) and a low voltage (available from the primary cell 108) in order to control the switching between a high-performance task and a low-performance task. Such an ADC can, for example, be an embedded component onboard the microprocessor 114. The ADC can be controlled by the microprocessor 114 so as to be periodically turned on for measuring the voltage available from the power supply 106, and then be turned off. The ADC will typically have a very low power consumption, thus hardly affecting the energy available from the power supply 106. On occasion, the voltage available from the power supply 106 may be too high momentarily, for example when the energy scavenger 110 is active. Therefore, a voltage divider (not shown) may be used that is controlled by the microprocessor 114 via a switch (not shown) so as to be turned on and turned off. If the voltage divider were on continuously, too much current would be drained from the power supply 106.

The diagram of FIG. 1 shows the watchdog 116 as a component of the power supply 106. In this manner, the power supply 106 is a generic building block for different embodiments of the autonomous system 102. That is, the different embodiments of the autonomous system 102 use the same power supply 106, but different embodiments of the electronic circuitry 104, e.g., designed for different sets of tasks. The electronic circuitry 104 may not even have a microprocessor 114.

It may not be necessary to repeatedly perform the same specific high-performance function, only for the reason that sufficient energy remains available from the energy scavenger 110. It may be more practical to wait for a certain time period before again executing the same high-performance task again. Note that the electronic circuitry 104 remains turned-on as long as the primary cell has not been depleted. This implies that the system-clock of the electronic circuitry 104 remains active during the service life of the autonomous system 102. Accordingly, the electronic circuitry 104 may be configured for time-stamping the data resulting from execution of a specific task. The time stamps can then be used by the electronic circuitry 104 to discriminate between the different times when the same task was executed. If a time interval, which has elapsed since the last execution of the same task, is too short, the high-performance task will not be executed. Note that a write actions and erase actions in a non-volatile memory cause wearing of the non-volatile memory. The wearing becomes apparent when the threshold voltage at the floating gate of a transistor starts shifting, as a result of which the data stored in the non-volatile memory becomes unreliable. Also note that successive batches of data resulting from continuously repeating the carrying out of the same high-performance task may not result in more information than is provided by a single batch. The energy delivered by the energy scavenger 110 can then be used to replenish the charge of the primary cell 108 previously consumed by the electronic circuitry 104.

For safety reasons, it may be advisable to configure the electronic circuitry 104 for performing only a specific low-performance task in case the primary cell 108 gets exhausted and supplies a voltage below a certain threshold. The threshold is indicative of the state of the primary cell 108 when the primary cell 108 has discharged to a minimum acceptable level, below which recharging is not successful anymore. The electronic circuitry 104 then goes into a sleep mode, and only wakes up to issue a warning signal. For example, if the autonomous system 102 is a wireless sensor, the warning signal is sent as a radio signal that is repeated after a certain time interval, e.g., an hour. Optionally, the warning signal is added as data to the conventional radio data packets transmitted by the wireless transmitter (not shown) mentioned above. The electronic circuitry 104 may have been configured to increase the time interval between transmissions of successive data packets, if the power available from the primary cell 108 keeps on decreasing. In this manner, the electronic circuitry 104 keeps on functioning until the primary cell 108 has run out of power. An additional advantage is that this approach is in line with the way the primary cell 108 gets depleted. The operation of the primary cell 108, i.e., supplying of an electric current, is driven by chemical reactions between chemical compounds distributed across the spatial volume of the primary cell 108. At low currents, e.g., the current required for powering the microprocessor 114 to process data local to system 102, the total spatial volume of chemical compounds is involved in producing the current, flowing from a first terminal (not shown) of the primary cell 108 via the electronic circuitry 104 to a second terminal (not shown) of the primary cell 108. However, high currents, a current required to power a wireless transmitter or an actuator as discussed above, are mostly supplied by the active volume of the primary cell 108 close to the first and second terminals (not shown) of the primary cell 108. The spatial distribution of the electric charge across the active volume of the primary cell 108 will initially deviate from equilibrium after the primary cell 108 has supplied the high current. It will take some time for the electric charges to migrate through the volume so as to assume the equilibrium distribution.

Preferably, the energy supplied by the energy scavenger 110 that is not used to power the electronic circuitry 104 is used to replenish the charge drawn from the primary cell 108 by the electronic circuitry 104. The proper way to recharge the primary cell 108 depends on the specific type (e.g., an alkaline battery, a lithium thionyl chloride battery, a lithium sulphur dioxide battery, etc.), and on the extent of discharge. Therefore, it is advisable to employ a control circuit (not shown) between the energy scavenger 110 and the primary cell 108 in order to control the recharging of the primary cell 108. The control circuit may be implemented by means of the microprocessor 114 or another microprocessor (not shown) programmed for controlling the recharging of the primary cell 108 according to a pre-determined algorithm.

As an example of an embodiment of the apparatus 100, consider a piece of railway rolling stock, such as a freight car. The freight car typically has a first wheel truck (US; or: a bogie (UK)) and a second wheel truck at a first end and a second end, respectively, of the freight car. A wheel truck is a wheeled frame positioned underneath the freight car and carrying one or more axles supported in bearings. The freight car is sitting in the rail yard, waiting with other freight cars for being picked up and for being assembled into a train. The electronic circuitry 104 of the autonomous system 102 comprises a sensor (not shown) for detecting a temperature of the bearings. While the freight car is sitting in the rail yard, the electronic circuitry 104 of autonomous system 102 is operative in a low-power task to wirelessly transmit a signal now and again, to notify a receiver (not shown) of the presence of the autonomous system 102, and therefore of the presence of the apparatus 100. The signal comprises, e.g., an identifier of the autonomous system 102 or an identifier of the freight car and, optionally, information about the life expectancy of the primary cell 108. The energy consumed while carrying out the low-power task is drawn from the primary cell 108. Once the freight cars have been assembled into a freight train and the train has started rolling, the energy scavenger 110 starts scavenging energy from the movement of the freight car caused by, e.g., irregularities in the railroad track, passage through a railroad switch, etc. Powered by the energy available from the energy scavenger 110, the electronic circuitry 104 starts a high-power condition monitoring task. The condition monitoring task involves, for example, sensing the temperature of the bearings, type of vibrations at the bearings, etc., and logging information about the temperature and vibrations sensed in a non-volatile memory (not shown) of the electronic circuitry 104. So long as the train keeps moving, the energy scavenger 110 provides enough energy to let the electronic circuitry 104 carry out the high-performance task. There is no net energy taken from the primary cell 108 in order to carry out the high-performance task. As an option, the primary cell 108 is recharged with the surplus amount of energy, i.e., with the energy made available by the energy scavenger 110 not being used to drive the electronic circuitry 104.

Figure 2:
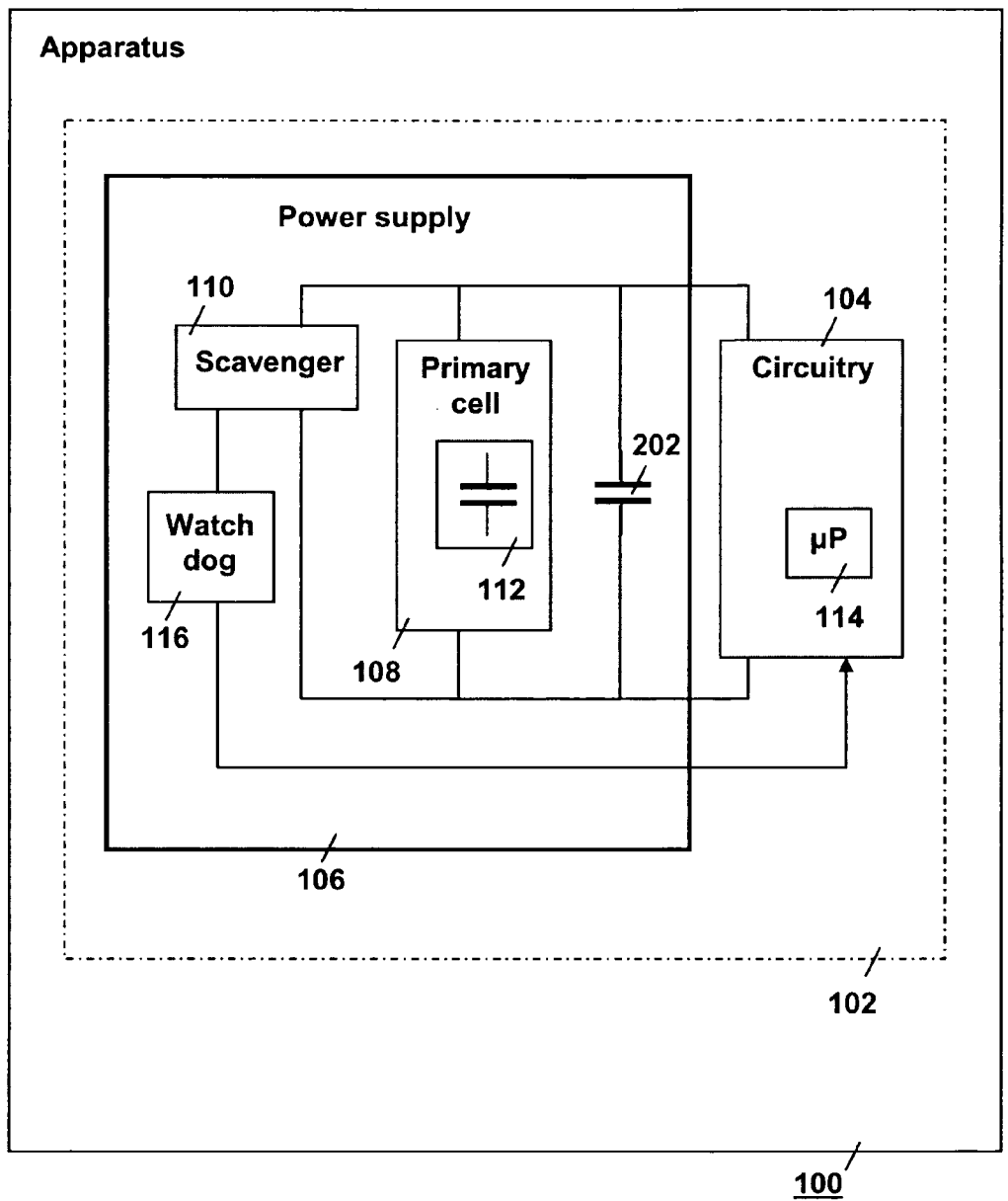

FIG. 2 is a block diagram of a second embodiment of the apparatus 100 in the invention. The second embodiment of the apparatus 100 of FIG. 2 differs from the first embodiment of the apparatus 100 in FIG. 1, in that the system 102 now comprises an additional capacitor 202 that is connected in parallel with the primary cell 108. The additional capacitor 202 is drawn as being accommodated at the power supply 106. Alternatively, the additional capacitor 202 could be accommodated at the electronic circuitry 104. The first embodiment of FIG. 1 uses the primary cell 108 as an impedance converter. In the second embodiment of FIG. 2 the additional capacitor 202 increases the effect. The additional capacitor 202 may increase the service life of the primary cell 108 even further. However, adding the additional capacitor 202 increases the cost and the footprint of the system 102 as compared to the configuration in the first embodiment of FIG. 1, and also gives rise to some leakage current in the additional capacitor 202.

The invention claimed is:

1. An apparatus comprising a system, the system comprising:
    electronic circuitry; and
    a power supply for powering the electronic circuitry,
    wherein the power supply comprises:
        a primary cell, and
        an energy scavenger operative to scavenge ambient energy and convert the scavenged ambient energy into electric energy,
    wherein the primary cell is configured to power the electronic circuitry when the energy scavenger is inactive,
    wherein the electronic circuitry is configured to perform high-performance operations,
    wherein the energy scavenger is configured to:
        power the electronic circuitry with the electric energy via a capacitance of the primary when the electric circuitry is performing the high-performance operations, wherein the capacitance is a buffer for the electric energy, and
        recharge the primary cell with the electric energy,
    wherein the electronic circuitry is configured to perform low-performance tasks when the primary cell is exhausted, and
    wherein the low-performance tasks comprise the electronic circuitry entering into a sleep mode and waking up to issue a warning signal, and
    wherein the warning signal is sent as a radio signal that is repeated after a predetermined time interval.

2. The apparatus of claim 1, wherein
    the electronic circuitry is configured to selectively operate in a low-power mode when the energy scavenger is inactive or in a high power mode when the energy scavenger is active.

3. The apparatus of claim 2, the system comprising a watchdog circuit configured to detect whether the energy scavenger is active.

4. The apparatus of claim 3, wherein the electronic circuitry comprises a microprocessor and wherein the watchdog circuit is part of the microprocessor.

5. The apparatus of claim 1, the system further comprising a capacitor electrically connected in parallel to the primary cell.

6. The apparatus of claim 1, wherein the system is a wireless sensor configured to perform condition monitoring of the apparatus.

7. A system, comprising:
    electronic circuitry; and
    a power supply for powering the electronic circuitry, the power supply comprising:
        a primary cell, and
        an energy scavenger configured to scavenge ambient energy and convert the scavenged ambient energy into electric energy,
    wherein the primary cell is configured to power the electronic circuitry when the energy scavenger is inactive,
    wherein the electronic circuitry is configured to perform high-performance operations,
    wherein the energy scavenger is configured to:
        power the electronic circuitry with the electric energy via a capacitance of the primary cell when the electric circuitry is performing the high-performance operations, wherein the capacitance a buffer for the electric energy, and
        recharge the primary cell with the electric energy,
    wherein the electronic circuitry is configured to perform low-performance tasks when the primary cell is exhausted,
    wherein the low-performance tasks comprise the electronic circuitry entering into a sleep mode and waking up to issue a warning signal, and wherein the warning signal is sent as a radio signal that is repeated after a predetermined time interval.

8. The system of claim 7, wherein the electronic circuitry is configured to selectively operate in a low-power mode when the energy scavenger is inactive or in a high power mode when the energy scavenger is active.

9. The system of claim 8, further comprising a watchdog circuit configured to detect whether the energy scavenger is active.

10. The system of claim 9, wherein the electronic circuitry comprises a microprocessor and wherein the watchdog circuit is part of the microprocessor.

11. The system of claim 7, further comprising a capacitor electrically connected in parallel to the primary cell.

12. A power supply for powering electronic circuitry, wherein:
the power supply comprises:
a primary cell; and
an energy scavenger configured to scavenge ambient energy and convert the scavenged ambient energy into electric energy;
wherein the primary cell is configured to power the electronic circuitry when the energy scavenger is inactive,
wherein the electronic circuitry is configured to perform high-performance operations,
wherein the energy scavenger is configured to:
power the electronic circuitry with the electric energy via a capacitance of the primary cell when the electric circuitry is performing the high-performance operations, wherein the capacitance is a buffer for the electric energy, and
recharge the primary cell with the electric energy,
wherein the electronic circuitry is configured to perform low-performance tasks when the primary cell is exhausted,
wherein the low-performance tasks comprise the electronic circuitry entering into a sleep mode and waking up to issue a warning signal, and
wherein the warning signal is sent as a radio signal that is repeated after a predetermined time interval.

13. The power supply of claim 12, further comprising a capacitor electrically connected in parallel to the primary cell.

14. A method of powering electronic circuitry, the method comprising:
scavenging ambient energy from an apparatus;
converting the scavenged ambient energy into electric energy; and
in response to the scavenging of the ambient energy, supplying the electric energy to:
power the electronic circuitry through a capacitance of a primary cell when the electric circuitry is performing the high-performance operations, wherein the capacitance of the primary cell is used as a buffer for the electric energy, and
recharge the primary cell,
wherein the electronic circuitry is configured to perform low-performance tasks when the primary cell is exhausted,
wherein the low-performance tasks comprise the electronic circuitry entering into a sleep mode and waking up to issue a warning signal, and
wherein the warning signal is sent as a radio signal that is repeated after a predetermined time interval.

15. The apparatus of claim 1, wherein the electronic circuitry is configured to perform low-performance tasks when the energy scavenger is inactive.

16. The apparatus of claim 1, wherein the primary cell is exhausted when a voltage of the electric energy supplied by the primary voltage is below a threshold.

17. The apparatus of claim 16, wherein the threshold indicates a state of when the primary has discharged to a minimum acceptable level.

18. The apparatus of claim 1, wherein the electronic circuitry is configured to increase the time interval between transmissions of successive radio signals as the electric energy supplied by the primary voltage decreases.

19. The apparatus of claim 1, wherein the buffer converts a high output-impedance of the energy scavenger into a low-impedance voltage source as the electric energy.

* * * * *